No. 713,756. Patented Nov. 18, 1902.
J. M. FAWCETT.
POULTRY COOP.
(Application filed Mar. 25, 1902.)
(No Model.)
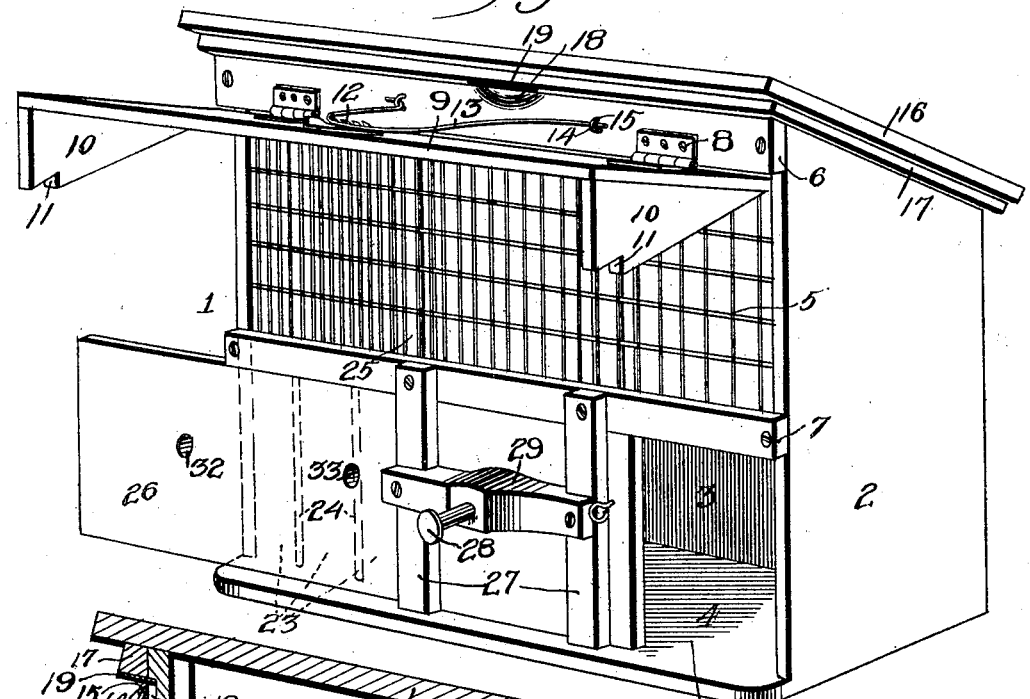
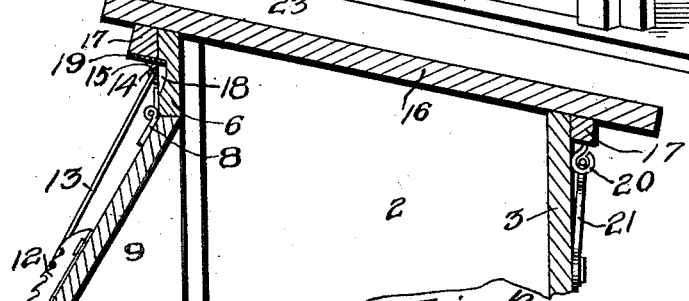
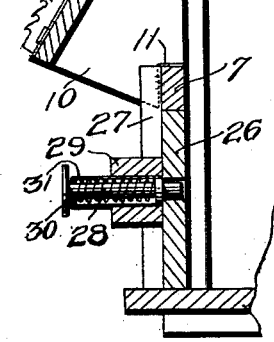
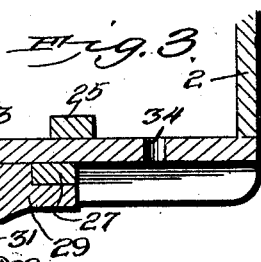
Witnesses
John M. Fawcett, Inventor
by
Attorneys

UNITED STATES PATENT OFFICE.

JOHN M. FAWCETT, OF KOKOMO, INDIANA.

POULTRY-COOP.

SPECIFICATION forming part of Letters Patent No. 713,756, dated November 18, 1902.

Application filed March 25, 1902. Serial No. 99,905. (No model.)

*To all whom it may concern:*

Be it known that I, JOHN M. FAWCETT, a citizen of the United States, residing at Kokomo, in the county of Howard and State of Indiana, have invented a new and useful Poultry-Coop, of which the following is a specification.

The invention relates to improvements in poultry-coops.

The object of the present invention is to improve the construction of poultry-coops and to provide a simple and comparatively inexpensive one adapted to protect chickens and other fowls from the storms and from animals and capable of affording perfect ventilation without subjecting the fowls to drafts.

A further object of the invention is to provide a chicken or poultry coop of this character adapted to afford ready access to its interior to enable it to be conveniently cleaned.

The invention also has for its object to provide a poultry-coop designed especially for the use of a hen and a brood of chickens and adapted to be readily arranged to confine the hen and permit the young chicks to pass freely out of and into it and capable of confining both the hen and young chicks and of being also arranged to permit egress and ingress of the hen and young chickens.

The invention consists in the construction and novel combination and arrangement of parts hereinafter fully described, illustrated in the accompanying drawings, and pointed out in the claims hereto appended.

In the drawings, Figure 1 is a perspective view of a poultry-coop constructed in accordance with this invention, the adjustable hood or shield being raised to illustrate the front of the coop. Fig. 2 is a central vertical sectional view. Fig. 3 is a horizontal sectional view of the front of the coop.

Like numerals of reference designate corresponding parts in all the figures of the drawings.

1 designates a poultry-coop provided with sides 2 and a back 3, which are mounted upon a bottom 4 and suitably connected to form an inclosure, and the said coop at the upper portion of its front is covered by a suitable screen 5, of wire or other suitable material, adapted to afford free access of air and capable of effectually preventing rats or other animals from entering the coop at that point.

The sides 2 of the coop are connected at their front edges by upper and intermediate horizontal bars 6 and 7, located at the top and bottom of the front screen, as clearly shown in Fig. 1. The upper horizontal bar has connected to it by hinges 8 an adjustable hood 9, consisting of a front board or body portion and approximately triangular end wings 10, adapted to abut against the front edges of the sides 2 of the coop when the hood or shield is down, as illustrated in Fig. 2 of the drawings, and supporting the front board or body portion of the hood in an inclined position and offset from the front of the coop. The hood partially covers the screen of the front of the coop, and it extends downward to a point approximately in the same plane as the bottom of the screen, and it is adapted to effectually shield the front of the coop from wind, snow, rain, and the like, and at the same time it will permit perfect ventilation without exposing the fowls to drafts. The wings 9 are recessed at their lower ends at 11 to receive the intermediate horizontal bar 7 when the hood is arranged as shown in Fig. 2.

The hood is provided on its upper or outer face with a ratchet-bar 12, extending upward from the lower edge of the hood and provided with shouldered teeth which are adapted to be engaged by a bail or loop 13, constructed of wire or other suitable material and adapted to support the hood in an elevated position. The ratchet-bar 12 is preferably constructed of flanged metal and is approximately L-shaped in cross-section, one of the flanges being secured to the hood and the other flange being provided with the said teeth, which are preferably hook-shaped, as shown. The loop or bail, which is approximately U-shaped, has its terminals bent outward to form pivots 14, which are arranged in suitable eyes 15 of the coop. The eyes, which may consist of staples or other suitable fastening devices, are preferably mounted upon the upper horizontal bar. The said loop or bail is adapted to swing upward and downward, and by engaging its outward portion with the teeth of the ratchet-bar the hood may be readily supported at the desired adjustment.

The cover or top 16, which is arranged at an inclination to shed water, is removable to afford ready access to the coop for conveniently cleaning the same, and it is provided near its edges with cleats 17, arranged on its lower face and forming flanges which are adapted to fit around the sides and ends of the coop, whereby the cover is held against lateral and longitudinal movement when in place. The coop is provided at its front with a recess 18, which is engaged by a lug or tongue 19, consisting of an approximately segmental plate secured to the front cleat and extending inward or rearward therefrom and projecting into the said recess 18, as clearly shown in Fig. 2. The recess is formed with a shoulder at the top, and the projecting lip or flange 19 engages the same, whereby the front of the cover or top is held against upward movement. The cover or top is provided at the back with an eye 20, depending from the rear cleat and arranged to be engaged by a hook 21, mounted on the back of the coop and adapted to engage the said eye, whereby the cover or top is detachably secured to the body of the coop. When the cover or top is removed, access is readily had to the interior of the coop, and the latter may be quickly cleaned and be kept in the proper condition.

The coop is provided at the front adjacent to one side with a large opening 22, and it has a series of small openings 23 at the opposite side, the openings 23 being preferably formed by vertical rods 24, which divide the space between the adjacent side 2 and the post or upright 25 into a number of smaller spaces. The small spaces 23 are designed to afford passage-ways for young chickens, and the large opening is designed to afford a passage-way for a hen, the large opening being covered when it is desired to confine the hen in the coop and permit the brood to pass inward and outward freely. Both the large opening and the series of small openings are covered to confine the hen and the brood in the coop. This is effected by means of a slide 26, mounted in suitable ways and arranged to move horizontally, the ways being preferably formed by the uprights or posts 25, the intermediate horizontal bar 7, and a pair of vertical bars 27, secured to the bar 7 and to the bottom of the coop. The vertical bars 7, which extend from the bottom of the coop to the horizontal bar 7, are spaced from the uprights or posts 25 to receive the slide 26, which is secured at the desired adjustment by a spring-actuated bolt 28. The spring-actuated bolt 28 is mounted on a horizontal supporting-bar 29 and is engaged by a spiral spring 30, housed within a tubular casing 31 and engaging the outer end of the same and a suitable stop or flange of the bolt. The said spring is adapted to move the bolt inward to the position shown in Fig. 3, and the slide is provided with three openings 32, 33, and 34. The opening 32 is located near one end of the slide, the opening 33 is arranged at the center of the same, and the other opening 34 is located at the other end of the slide. When the bolt is in engagement with the central opening 33, the slide closes the coop and confines the hen and young chickens or other fowls therein, and when the bolt engages the opening 34 of the slide the latter is arranged as shown in Fig. 1 to uncover the large opening 32. The slide is adapted also to be moved from the position shown in Fig. 1 horizontally until the opening 32 is brought opposite the bolt. This will uncover the openings 23 and cover the opening 22, thereby confining the hen in the coop and permitting the young chickens free egress and ingress to the same.

The sides, back, and bottom may be connected together and to the front in any suitable manner desired and they may be detachably secured together and to provide a knock-down coop, and I desire it to be understood that these and similar changes within the scope of the claims may be made without departing from the spirit of the invention.

It will be seen that the poultry-coop is exceedingly simple and inexpensive in construction; that the adjustable hood is adapted to afford perfect ventilation when closed and is capable of excluding wind, rain, snow, and the like, so that the fowls will not be subjected to drafts, and that ready access is afforded to the coop to enable the same to be conveniently cleaned; also, it will be clear that the coop may be readily arranged for confining a hen and her brood or for permitting either the brood or both the hen and the brood to pass into and out of the coop. Furthermore, it will be clear that the coop when closed will effectually exclude rats and other animals and fully protect the fowls from the same.

What I claim is—

1. The combination of a coop, a hood hinged at its top to the coop and provided with approximately triangular wings arranged at its ends in position to abut against the coop to support the hood in its lowered position, a ratchet-bar disposed transversely of the hood at the upper face of the same, and an approximately U-shaped loop or bail hinged at the terminals of its sides to the coop and arranged to engage the teeth of the ratchet-bar, whereby the hood is supported at the desired adjustment, substantially as described.

2. The combination of a coop provided at its bottom with ways and having openings at opposite sides thereof, said coop being also provided with vertical bars forming portions of the ways and located adjacent to the center of the coop, a slide mounted in the ways, a horizontal supporting-bar secured to the vertical bars and a locking device mounted on the supporting-bar and engaging the slide, substantially as described.

3. A coop comprising a bottom, sides, a back, a top, a screen covering the upper portion of the front of the coop, uprights or bars 25, an intermediate bar arranged horizontally and spaced from the bottom of the coop, the outer vertical bars, rods extending from the bottom of the coop to the intermediate bar and located adjacent to one of the sides of the coop, a slide arranged between the outer vertical bars and the inner uprights or bars and capable of longitudinal movement, and a locking device supported by the outer vertical bars and engaging the slide, substantially as described.

4. A coop comprising a bottom, sides, a back, upper and intermediate horizontal bars secured to the sides at the front thereof, the screen covering the upper portion of the front of the coop, uprights or bars 25 extending from the bottom to the upper horizontal bar, the outer vertical bars extending from the bottom to the intermediate horizontal bar, a slide arranged between the uprights and the outer vertical bars, a locking device for engaging the slide, a hood hinged to the upper horizontal bar, and means for supporting the hood in its adjusted position, substantially as described.

In testimony that I claim the foregoing as my own I have hereto affixed my signature in the presence of two witnesses.

JOHN M. FAWCETT.

Witnesses:
J. R. MORGAN,
G. D. JAY.